Figure 1:
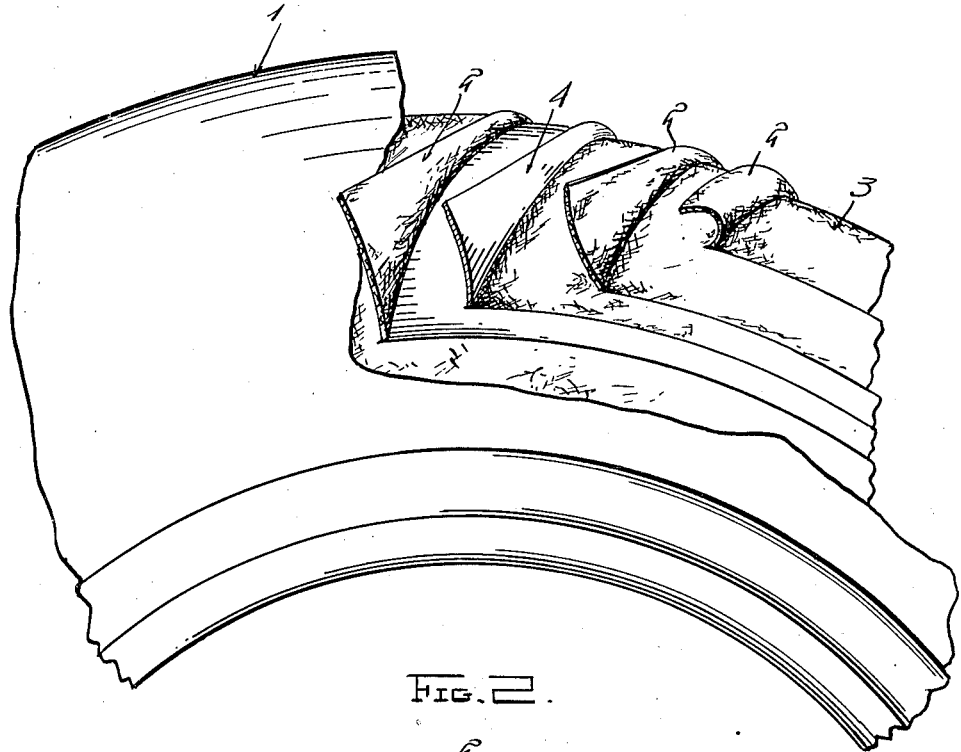

L. LOEB.
PNEUMATIC TIRE.
APPLICATION FILED DEC. 28, 1915.

1,292,405.

Patented Jan. 21, 1919.

Witnesses

Inventor
L. Loeb.
By
Attorneys

UNITED STATES PATENT OFFICE.

LEO LOEB, OF NEW YORK, N. Y.

PNEUMATIC TIRE.

1,292,405.  Specification of Letters Patent.  Patented Jan. 21, 1919.

Application filed December 28, 1915. Serial No. 69,071.

*To all whom it may concern:*

Be it known that I, LEO LOEB, a citizen of the United States, residing at New York city, in the county of New York, State of New York, have invented certain new and useful Improvements in Pneumatic Tires; and I do hereby declare the following to be a full, clear, and exact description of the invention, such as will enable others skilled in the art to which it appertains to make and use the same.

This invention relates to new and useful improvements in pneumatic tires.

I am aware of the fact that numerous tires have been constructed wherein a protector for the inner tube is provided. I am acquainted with one type of tire in which a rawhide tube is provided, which tube is located between the usual fabric portion of the shoe and the inner tube. There are certain inherent disadvantages in a construction of this sort. For instance when the rawhide is placed between the fabric and the rubber inner tube, the hardness of the rawhide effects the resiliency of the tire and furthermore with this construction the rawhide would undoubtedly crack as the pressure within the tire is reduced and inasmuch as it is directly in contact with the rubber of the inner tube it would cause the inner tube to be broken.

It is an object of my invention to provide a tire in which a rawhide lining or protector is included which is so arranged that all of the advantages inherent in a structure such as above referred to are present and yet one which will possess none of the disadvantages thereof.

A further object of my invention resides in the provision of a rawhide lining which will strengthen the tire, will protect the inner tube from puncture and will allow the tire to be inflated with great pressure.

With these and other objects in view, such as will appear as my description progresses, my invention comprises the combination and arrangement of parts as set forth in and falling within the scope of the appended claim.

Figure 2:
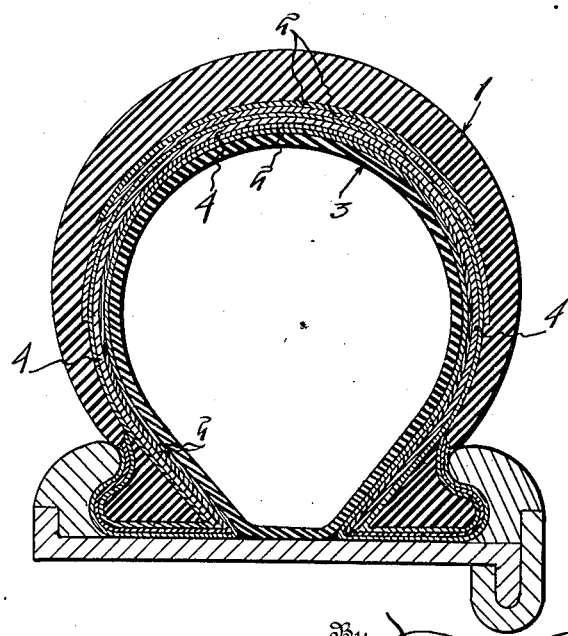

In the drawing:

Figure 1 is a fragmental view of a tire showing portions of the same broken away to illustrate the several elements thereof, and Fig. 2 is a sectional view of the same.

Referring to the drawing by reference characters wherein like parts are indicated by like characters throughout the several views:

In carrying out my invention, I construct a tire in the following manner:

The usual rubber shoe 1 is provided which has formed on the inner side thereof a plurality of layers of fabric 2 of canvas, duck or other suitable material. An inner rubber tube 3 is located within the tube in the manner illustrated.

In order that the inner tube may be protected so that it will not be liable to puncture and so that it may be subjected to great air pressure, I have provided a lining or protector 4 which is made of rawhide and is interposed between two of the layers of the fabric 2. This lining 4 is provided with an adhesive material on both of its sides by means of which it is secured to the adjacent layers of fabric.

The location of this rawhide lining between two of the layers of fabric is particularly advantageous inasmuch as it will prevent the fabric from stretching and consequently the diameter of the shoe will remain constant. Furthermore the provision of this lining will greatly reduce the weight of the shoe inasmuch as the number of pieces of fabric may be greatly reduced from that ordinarily used. Furthermore it will be practically impossible for the lining to crack owing to its disposition between the layers of fabric and its attachment thereto. Furthermore even should the rawhide crack its value will not be lessened as the fabric will maintain the parts thereof in their initial relative positions and furthermore will prevent the cracked portion of the rawhide from abrading or otherwise injuring the inner tube.

While I have illustrated and described a particular embodiment of my invention, it has merely been for the sake of convenience and I do not wish to be limited to that particular embodiment as it is obvious that numerous changes may be made within the scope of the invention without departing from the spirit of the invention or exceeding the scope of the appended claim.

What I claim is:—

In an automobile tire, the combination with the tread body and clencher beads, of a laminate lining secured within the body and consisting of a fabric body united with the inner surface of the tread body, a rawhide sheet united throughout its area to the inner surface of the fabric body, and a second fabric body united throughout its area to the rawhide sheet, said fabric bodies and the rawhide sheet extending transversely from one bead to the other and continuously in annular direction.

In testimony whereof, I affix my signature, in the presence of two witnesses.

LEO LOEB.

Witnesses:
   FELIX F. LILIENTHAL,
   MORTIMER KAUFMAN.